June 1, 1965 C. H. MOORE 3,186,431
CONNECTION ASSEMBLY FOR PRESSURE LINES
Filed Dec. 24, 1962 3 Sheets-Sheet 1
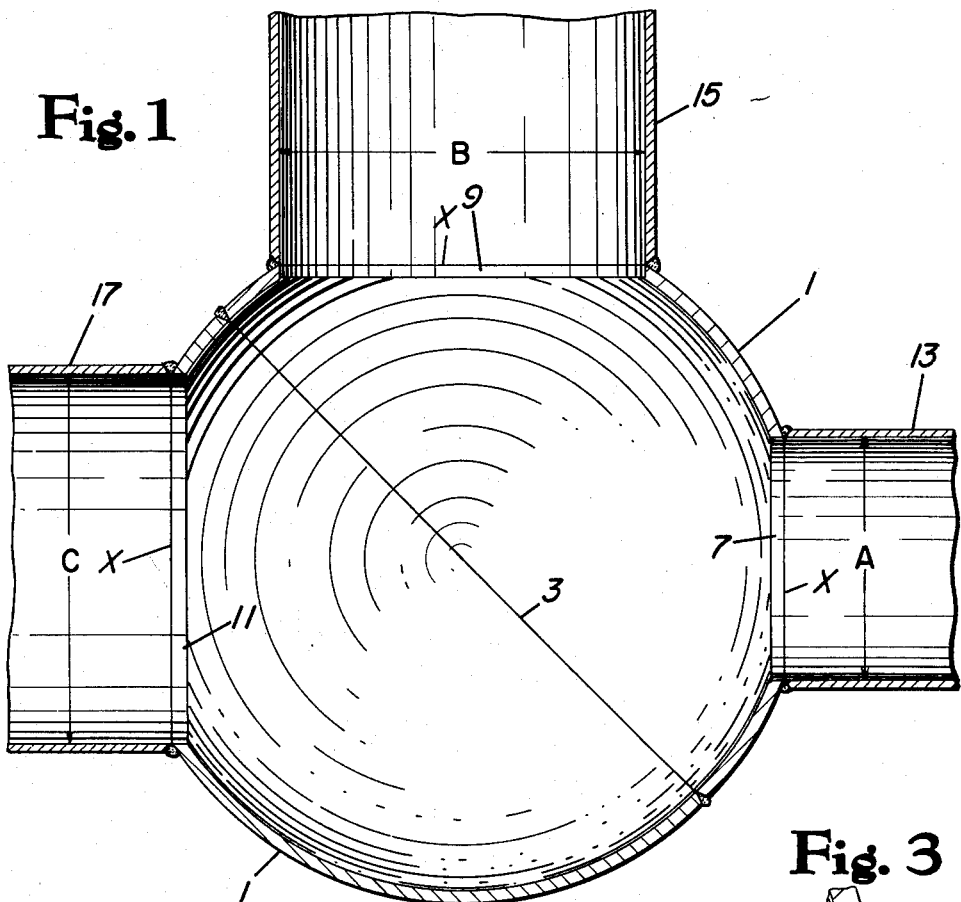
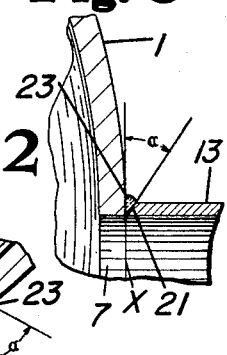
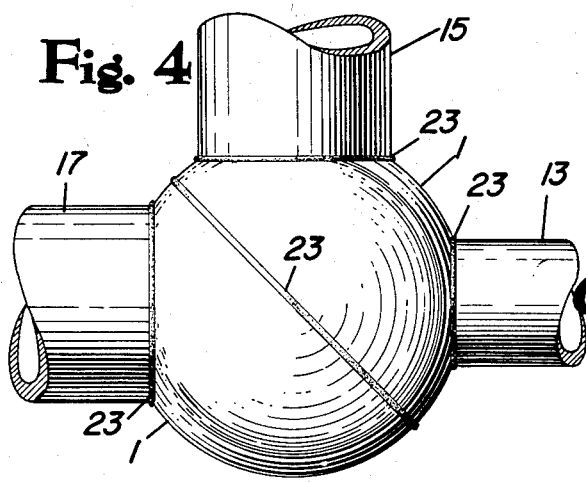
Charles H. Moore
INVENTOR
BY Robert U. Geib, Jr.
ATTORNEY

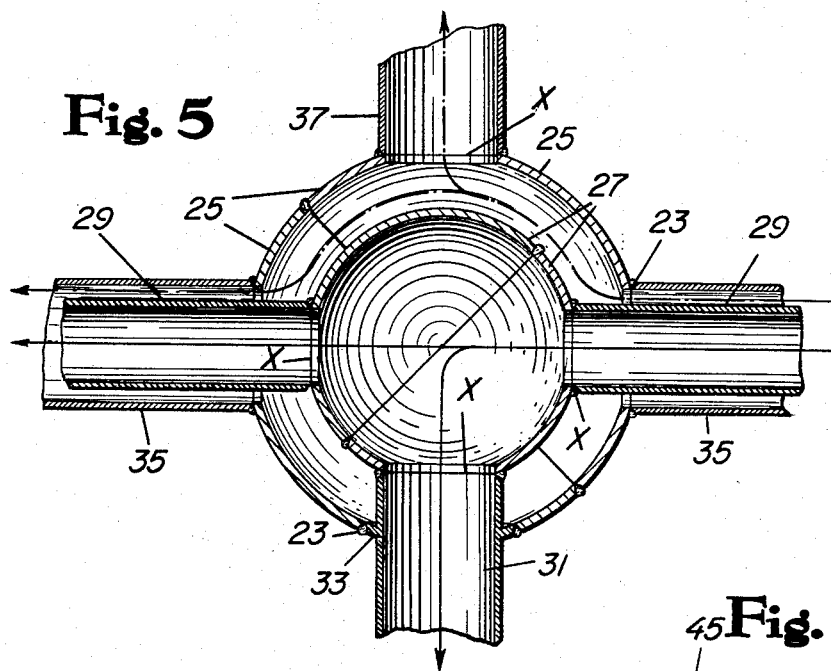
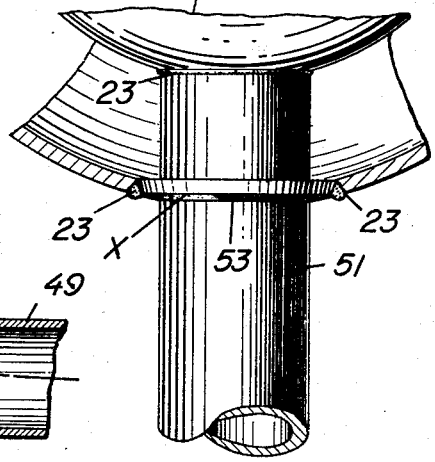
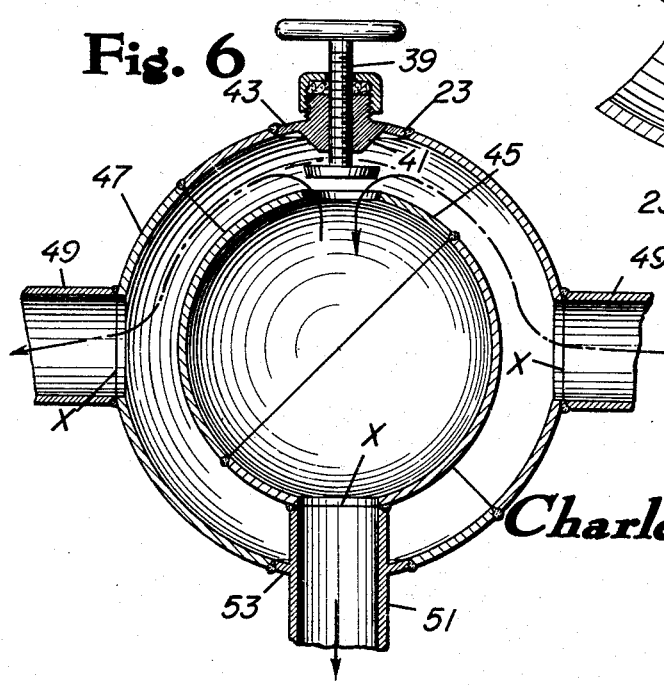
Charles H. Moore
INVENTOR

June 1, 1965 C. H. MOORE 3,186,431
CONNECTION ASSEMBLY FOR PRESSURE LINES
Filed Dec. 24, 1962 3 Sheets-Sheet 3

Charles H. Moore
INVENTOR
BY Robert U. Geib, Jr.
ATTORNEY

United States Patent Office 3,186,431
Patented June 1, 1965

3,186,431
CONNECTION ASSEMBLY FOR PRESSURE LINES
Charles H. Moore, R.D. 4, West Chester, Pa.
Filed Dec. 24, 1962, Ser. No. 246,842
5 Claims. (Cl. 137—561)

This invention relates to connection assemblies for pressure lines for fluids under pressure and more particularly to spherical connector elements as used to connect pipes and tubes of varying sizes.

The present application is a continuation in part of my patent application Serial No. 739,584, entitled Connection Member for Pressure Lines and filed June 3, 1958 (now abandoned).

As stated in the preamble to the specification of my aforesaid patent application Serial No. 739,584, many methods have been used in the past for joining pressure pipes, a well as the insertion or application therein of branch outlets, such for example as a standard T.

Early proposals in this art involved cutting an opening in the pipe line (usually by burning methods) and welding in such opening the branch take-off or other desired fixture. There were certain shortcomings in this practice, the first of which is that during the burning process slag became trapped in the main pipe the same being difficult if not impossible to remove; but more particularly there were the objectionable, sharp corners at the juncture of the branch (or take-off) with the main line which naturally impeded the flow of fluid through the branch. In order to overcome objections T's were welded in the main line, and there T's were provided with take-off necks having curved inner surfaces to eliminate sharp objectionable corners. Such T's usually maintained the same thicknesses of the main pipe with which they were to be associated; and in some instances the crotch portions where the take-off branch was disposed were for reenforcement purposes provided with additional thickness. In addition to the T's which were proposed, certain other constructions were contemplated, such as the insertion in a formed opening in the main pipe of a specially formed spacer member compressing a relatively short collar having a flair and a thickened lower wall which fit the pipe opening and was welded thereto; the inner walls of such coupling being so shaped as to avoid the objectionable sharp corners referred to earlier herein. Pursuant to the immediately aforementioned practice the take-off line is welded to the outer end of the connecting collar.

It is generally recognized that the connection of the branch outlet at the crotch is the weak point in connections of this general character and must be given all consideration where excessively high pressures or temperatures are encountered. Moreover, it is also well-recognized that the absence of sharp shoulders at the take-off opening is essential in obtaining maximum pressures in the take-off line. Furthermore the reinforcement of the branch outlet is required in order that the connection may withstand the greater stresses arising from expansion, contraction, pulsation and internal pressure that would be the case in a straight line run.

In an effort to accomplish proper flow and reinforcements of the devices briefly described hereinbefore, manufacturers are subjected to considerable expense due to the great variety of line pipe sizes and branch outlets required. To construct all such devices of varying sizes is enormous, due principally to the investment in dies; and the stocking of such sizes is likewise burdensome. Such devices made for use in connection with pipe of standard weight are practically useless in instances where extra heavy and thicker walled pipes are now made in keeping with the present trend toward increasing pressures.

The device of the present invention is a connection assembly for pressure lines regardless of size or weight which may, with comparative ease, be inserted securely in the pressure line to provide means whereby outlets, take-offs or other devices may be tapped or connected therein by simple and inexpensive processes, while assuming maximum fluid pressure in the take-offs.

Another object is an assembly of the type described which overcomes the objections of the prior art devices and which may be simply and easily manufactured and installed.

Another object is to provide a connection assembly of such character that any type of known connection may be easily and quickly accommodated such as elbows, bends, saddles, sleeves, reducers, return bends, nozzles, necks, etc.

Still another object of the invention is to provide a connection assembly which may be employed in a double pipe line; that is, one pipe within a larger pipe, and wherein connections or outlets may be readily made in either or both pipe lines with valves provided for the control of fluid through either or both of such take-offs.

A further object is the provision of a connection assembly which may be readily applied in sealed relationship within an existing pipe line and over either a capped end thereof or to enclose a faulty connection already existing in the line without disturbing such connection.

With these and objects definitely in view this invention comprises the novel construction, combination and arrangement of elements as will be hereinafter described in the specification, particularly pointed out in the claims, and illustrated in the accompanying drawings which form a material part of this disclosure and wherein similar reference characters designate the same elements, and in which:

FIGURE 1 is a transverse sectional view of a connection assembly which has been constructed in accordance with the teachings of the present invention.

FIGURES 2 and 3 are enlarged fragmentary views of FIGURE 1 as will be explained hereinafter; and FIGURE 4 is an elevational view of the connection assembly of the present invention, but on a smaller scale.

FIGURE 5 is a sectional view illustrating another form of the present invention as applied to connectors to be used one within another for association with pipes concentrically arranged one within another.

FIGURE 6 is a view similar to FIGURE 5 but showing valve means for cutting off the outlet of the connector without effecting the flow of fluid through the main line, FIGURE 7 is a detail, partly in elevation, of a portion of the showing of FIGURE 6.

Figure 8:
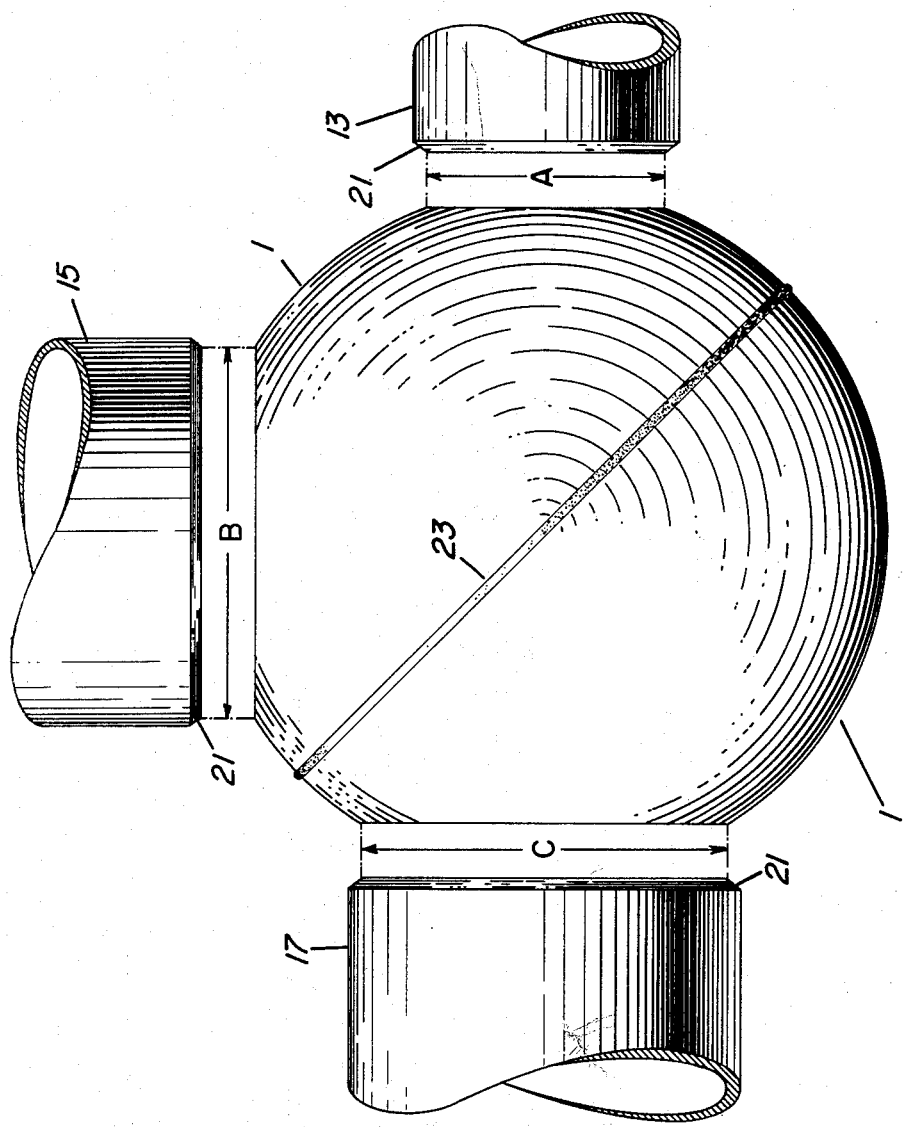
FIGURE 8 is an elevational exploded view of a connector of the present invention.

Referring more particularly to the drawings, and especially to FIGURE 1, the numeral 1 designates one of a pair of semi-spherical forged or pressed steel shells, said shells being assembled to form a sphere that serves as the connector member for one, two or more pipes of a fluid pressure line.

As stated in my aforementioned patent application Serial No. 739, 584, a connector member of spherical shape is superior to those of other shapes because of the uniformity of stresses and strains under pressure, shock, expansion, contraction or pulsations. Moreover, the fluid pressures within a sphere are equal radially in all directions therein, thus insuring maximum resistance to pressures in any take-off or outlet connections. Furthermore, with a spherical connector inserted in a line of fluid pressure, the presence or absence of sharp shoulders or abutments at the points of connection between the mains and the connector as well as the take-off therewith, do not in any way affect the flow of pressure in any direction within the sphere because such pressure is equal radially in all directions. Again, due to the spherical shape of the connector, the pressures being equal in all directions, the walls thereof need not necessarily be particularly heavy, thus working for economy in the manufacture of the connector.

In the art of fluid distribution it is well known that spheres can withstand considerably greater internal pressures than cylinders. Stated in another way, a given internal pressure may be handled by a sphere of considerably less wall-thickness than a cylinder: as a rule of thumb, approximately one-half. That is, a sphere of 24 inch O.D. and ½ inch wall-thickness will withstand approximately as much working pressure as a cylinder of 24 inch O.D. and one inch wall-thickness.

According to the teachings of the present invention the meeting or adjoining edges 3 of the semi-spherical steel shells 1 are bevelled on their outer peripheral portions at approximately 37.5 degrees (if the wall thickness is no greater than ¾") and joined together by a continuous weld as shown.

In the interests of accuracy, etc., the aforementioned bevelled portions are preferably formed by machining.

Referring still to FIGURE 1, circular openings 7, 9 and 11 are formed in the sphere comprising the two semi-spherical forged or pressed steel shells 1 for communication with pipes 13, 15 and 17 respectively. In the illustrative embodiment of FIGURE 1, two of the circular openings (7 and 9) are formed in one of the semi-spherical forged or pressed steel shells 1 with its counterpart having but a single opening (11).

It will be observed that in FIGURE 1, the circular opening 7 is considerably smaller in diameter than the circular openings 9 and 11. According to a specific adaptation of the teachings of the present invention the outside diameter of the sphere formed of the two semi-spherical steel shells 1 was 43⅛ inches and with a wall-thickness of ½ inch and it was pressed rather than forged. The circular opening 7 was 15 inches in diameter, and the diameter of each of the circular openings 9 and 11 was 23 inches.

The wall-thickness of each of the pipes 13, 15 and 17 was ½ inch; and the interior surfaces theerof were accurately aligned with the walls of their respective circular openings in the sphere, i.e. 7, 9 and 11.

As in the case of the meeting or adjoining edges of the two semi-spherical pressed steel shells 1, the peripheral portions of the ends of the pipes 13, 15 and 17 were bevelled at approximately 37.5 degrees and joined to the adjacent surfaces of the sphere by continuous welds the point of abutment of the extremity of the pipe with the exterior of the sphere being indicated at X. The angular relationship of the bevelled peripheral portions of the pipes is shown (in connection with the pipe 13) at 21 in FIGURE 3, with alpha indicating the included angle.

All of the welds described herein are indicated at 23; and it is essential to the teachings of the present invention that they be continuous and full-penetration welds as distinguished from "fillet" welds, etc.

Acceptably, the sphere formed of the two semi-spherical steel shells 1 may be composed of A 212 B Firebox Steel which is characterized by a tensile strength of approximately 77,400 lbs. The pipes 13, 15 and 17 may acceptably be composed of Grade B Pipe Steel, the tensile strength of which is approximately 77,000.

Excellent results were obtained from testing an embodiment of the present invention which conformed precisely to the preceding description both as to dimensions and materials of the various components. In this test each of the pipes 13, 15 and 17 was approximately 6 feet in length with the outer ends thereof closed by extra heavy caps or heads (not shown). Water was pumped into this test assembly starting at 200 pounds pressure per square inch and advanced in increments of 100 pounds pressure per square inch. Thirty-six readings were made on strain gauges located at various spots and recorded and the sphere proved itself as a connector over twice as strong as a standard weight *regular* T (as used today). Before acquiring a permanent "set," the sphere itself assumed an internal pressure of approximately 900 pounds per square inch.

Proceeding with a "destruction test" the test assembly referred to satisfactorily withstood an internal pressure of approximately 1900 pounds per square inch. At slightly above 1900 pounds per square inch, one of the two larger pipes (15) cracked at the attaching weld but not the body of the pipe nor the sphere composed of the two semi-spherical pressed steel shells.

In the various views of the drawings the letter X designates a plane which is tangent to the sphere which is formed of the semi-spherical shells 1 and which define the openings in said sphere. It is at this point that the adjacent ends of the various pipes terminate and are joined to the sphere by the continuous full-penetration welds 23.

As mentioned earlier herein, the bevel or chamfer on the inner ends of the various pipes is at approximately 37.5 degrees in situations where the wall-thickness of the pipes and the sphere is no greater than ¾ of an inch. Where the wall-thickness of the pipes and the sphere is greater than ¾ of an inch bevels of different angularity will be employed, pursuant to the requirements of the American Society of Mechanical Engineers.

The embodiment of FIGURE 5 employs a pair of concentric spheres, as shown at 25 and 27. The outer sphere 25 is provided with four (4) equidistant openings and the inner sphere with but three (3). The openings in the sides of the inner sphere 27 communicate with pipes 29.

The bottom opening of the outer sphere 25 receives a pipe 31 having an integrally-formed radially extending frusto-conical flange 33 the periphery of which is bevelled at approximately 37.5 degrees and disposed opposite a similar bevel on the sidewall of the adjacent (bottom) opening of the outer sphere. These bevelled portions are, in the manner described hereinbefore connected by continuous full-penetration welds 23.

As shown in FIGURE 5, two (2) of the openings in the outer sphere 25 are in (horizontal) alignment and connect with pipes 35 which are disposed concentrically around the pipes 29. The upper opening in the outer sphere communicates with a pipe 37, while the bottom opening in the inner sphere 27 communicates with an extension on the bottom pipe 31 for the bottom opening of the outer sphere. According to the embodiment of FIGURE 5 two (2) different fluids may be conveyed, the paths of the same being indicated by the arrows.

In the embodiment of FIGURE 6 a valve stem 39 extends through the upper opening in the outer sphere, the same being in screw-threaded engagement with a valve boss 41 carrying a cup-shaped flange 43 which is secured to the sidewall of the said upper opening; again by bevelling at approximately 37.5 degrees and applying a continuous full-penetration weld 23. The inner sphere of FIGURE 6 has an upper opening defined by a sidewall which forms a seat for a valve head carried on the inner end of the valve stem 39. In this embodiment the outer sphere 47 is provided with a pair of aligned side openings which communicate with pipes 49. The bottom opening in the outer sphere 47 receives a pipe 51 having a flange 53, the relationship being similar to that of the pipe 31 (and its flange 33) of FIGURE 5.

As shown in FIGURE 6, the pipe 51 is provided with an extension which communicates with a bottom opening in the inner sphere 45.

It will be observed that in each and every instance the connections are obtained through the bevelled relationship and the continuous full-penetration welds (23); and except for those situations where a pipe extends through the outer sphere to communicate with the inner sphere (i.e. pipes 31 and 51 in FIGURES 5 and 6, respectively) the communicating pipes terminate exteriorly on the spheres.

Having described and illustrated the means by which the objects of the invention are obtain, I claim:

1. A pipe connector formed of metal and used as a T, cross, reducer, bend, or a combination of such; said pipe connector consisting essentially of a pair of substantially identical hemispherical heads in opposed relationship with their adjoining edges joined together with a continuous weld thus forming a hollow sphere; said hollow sphere having at least two circular openings therein; said openings being so spaced from the adjoining edges of said hemispherical heads as not to intercept any portion of the continuous weld by which they are connected; the diameter of said hollow sphere with respect to the diameter of the openings therein being such that there is sufficient metal between the openings to adequately compensate by way of reinforcement for the weakening of the walls of the hollow sphere caused by the placing of the aforementioned openings therein; a pipe communicating with each of the circular openings in said hollow sphere; the internal diameter of each of said pipes corresponding to the diameter of the opening with which it communicates; said pipes being secured to said sphere by continuous welds.

2. The pipe connector of claim 1 wherein the continuous weld joining the pair of hemispherical heads is of the full penetration type.

3. The pipe connector of claim 1 wherein all of the continuous welds are of the full penetration type.

4. A connecting member for pressure pipe lines arranged one within another in spaced concentric relationship, a spherical shell having spaced openings therein to receive in sealing engagement therein the ends of the outermost of said pipe lines, a second spherical sheel arranged concentrically within the first mentioned shell and having spaced openings therein to sealingly receive the ends of the innermost of said pipe lines, a take-off pipe communicating with the interior of the outermost of said shells, and a second take-off pipe extending through the outermost of said shells and communicating with the innermost of said shells.

5. A connecting member for pressure pipe lines, comprising an outer spherical shell, said shell provided with spaced openings to sealingly receive the ends of said pipe lines, a second spherical shell arranged concentrically within the said outermost shell, a take-off line extending through said outermost shell and communicating with the interior of the inner shell, the said inner shell having an opening therein communicating with the space between said shells, and a valve extending through the said outer shell for opening or closing said opening.

References Cited by the Examiner

UNITED STATES PATENTS

| 915,792 | 3/09 | Palmer | 285—156 |
| 2,463,006 | 3/49 | Clute | 285—286 |
| 2,915,324 | 12/59 | Jackson | 285—286 |
| 2,981,556 | 4/61 | Jackson | 285—286 XR |

FOREIGN PATENTS

| 1,019,516 | 11/57 | Germany. |
| 1,022,858 | 1/58 | Germany. |

OTHER REFERENCES

Williamson Bulletin No. A–533 (2 pages), copyright 1956 by T. D. Williamson, Inc., Tulsa, Oklahoma.

M. CARY NELSON, *Primary Examiner.*